(12) United States Patent
McNamara et al.

(10) Patent No.: US 8,634,804 B2
(45) Date of Patent: Jan. 21, 2014

(54) DEVICES, SYSTEMS AND METHODS FOR LOCATION BASED BILLING

(75) Inventors: Justin Michael Anthony McNamara, Atlanta, GA (US); John Potts Davis, III, Marietta, GA (US); Jay Daryl Rector, Loganville, GA (US)

(73) Assignee: AT&T Mobility II LLC, Atlanta, GA (US)

(*) Notice: Subject to any disclaimer, the term of this patent is extended or adjusted under 35 U.S.C. 154(b) by 565 days.

(21) Appl. No.: 12/632,165

(22) Filed: Dec. 7, 2009

(65) Prior Publication Data

US 2011/0136468 A1    Jun. 9, 2011

(51) Int. Cl.
*H04M 11/00* (2006.01)

(52) U.S. Cl.
USPC ........ 455/406; 455/456.1; 455/457; 455/517; 455/456.2

(58) Field of Classification Search
USPC ......... 455/406, 407, 408, 409, 456, 457, 517, 455/414; 705/13, 10
See application file for complete search history.

(56) References Cited

U.S. PATENT DOCUMENTS

| | | | |
|---|---|---|---|
| 7,116,990 B2 | 10/2006 | Maanoja | |
| 7,428,510 B2 | 9/2008 | Titus | |
| 2002/0072333 A1 | 6/2002 | Gnesda | |
| 2003/0115095 A1* | 6/2003 | Yamauchi | 705/13 |
| 2003/0148771 A1* | 8/2003 | de Verteuil | 455/456 |
| 2004/0230480 A1* | 11/2004 | Kanayama | 705/13 |
| 2006/0030291 A1* | 2/2006 | Dawson et al. | 455/405 |
| 2006/0200379 A1* | 9/2006 | Biet | 705/13 |
| 2007/0002868 A1 | 1/2007 | Qian | |
| 2008/0046266 A1 | 2/2008 | Gudipalley | |
| 2008/0293436 A1 | 11/2008 | Fok | |
| 2008/0306868 A1* | 12/2008 | Robinson et al. | 705/40 |
| 2009/0012885 A1 | 1/2009 | Cahn | |
| 2009/0077210 A1 | 3/2009 | Musman | |

* cited by examiner

*Primary Examiner* — Manpreet Matharu
(74) *Attorney, Agent, or Firm* — Hartman & Citrin LLC

(57) ABSTRACT

Devices, systems and methods are disclosed which relate to billing users of a telecommunication network. A billing server is in communication with a geo-fence database. The geo-fence database contains a plurality of geo-fences. Some geo-fences are associated with a single mobile communication devices, such as a home geo-fence, work geo-fence, etc., while other geo-fences are global, such as a stadium geo-fence, toll geo-fence, etc. When a mobile communication device enters the perimeter of a geo-fence, a billing server changes the billing rate at which connections are billed to the user account or bills another user account. The mobile communication device may send a ticket code to the billing server for a reduced billing rate while within a geo-fence. If a mobile communication device enters a toll geo-fence, then the billing server charges the user account for the toll.

17 Claims, 6 Drawing Sheets

US 8,634,804 B2

DEVICES, SYSTEMS AND METHODS FOR LOCATION BASED BILLING

BACKGROUND OF THE INVENTION

1. Field of the Invention

The present invention relates to telecommunication networks. More specifically, the present invention relates to adjusting a billing rate of a user of a telecommunication network.

2. Background of the Invention

Communications devices, such as cellular phones, have become a common tool of everyday life. Cellular phones are no longer used simply to place telephone calls. With the number of available features rapidly increasing, cellular phones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

Today, there exist wireless devices that include several different types of transceivers to communicate with varied devices. For instance, a wireless device can include a cellular transceiver, as well as Wi-Fi, and Near-Field Communication (NFC) transceivers, such as BLUETOOTH, that can be used for several applications. For instance, there exist devices that allow a parent to monitor a child's movement. The device is attached to the child and communicates with NFC receivers around a perimeter. The device communicates with the NFC receivers to determine whether or not the child is within the perimeter. The NFC receivers are positioned to define a virtual perimeter within which the child is allowed to roam. If the child wanders outside of the perimeter, then a notification is sent to the parent.

Also, tolls and turnpikes are becoming more common on the roads and highways. Some toll highways and turnpikes use NFC systems to wirelessly pay the toll without stopping, but highways use a lot of different systems. Some toll highways and turnpikes calculate a custom toll based on the number of exits passed before exiting the highway. Some toll highways and turnpikes simply stop drivers at every exit for payment.

At stadiums, arenas, and other public forums, people gather in massive amounts for a relatively small time period. However, there is usually not an increase in cellular towers proportional to this number of people. This results in crowding and clogging of cellular resources within each tower due to the large number of users accessing it during an event.

What is needed in the art is a way to overcome crowding and clogging of cellular resources. There needs to be a way to encourage users to use their cellular services in a more uniform and predictable manner.

SUMMARY OF THE INVENTION

The present invention discloses devices, systems, and methods which overcome the problems and inefficiencies by encouraging users to use their cellular services in a more uniform and predictable manner. Exemplary embodiments of the present invention feature a billing server in communication with a geo-fence database. The geo-fence database contains records for a plurality of geo-fences. Some geo-fences are associated with particular mobile communication devices, such as a home geo-fence, work geo-fence, etc., while other geo-fences are global, such as a stadium geo-fence, toll geo-fence, etc. When a mobile communication device enters the perimeter of a geo-fence, the billing server changes the rate at which connections are billed to the user account, or bills another user account. The mobile communication device can send a ticket code to the billing server for a reduced billing rate while within a geo-fence. If a mobile communication device enters a toll geo-fence, then the billing server charges the user account for the toll.

In one exemplary embodiment, the present invention is a system for billing a user of a telecommunication network based on location. The system includes a mobile communication device on the telecommunication network, a billing server on the telecommunication network, a user account database in communication with the billing server, the user account database having a plurality of user accounts, a geo-fence database in communication with the billing server, the geo-fence database having a plurality of geo-fences, a billing logic on the billing server for receiving a location of the mobile communication device during a connection, determining the location to be within a first geo-fence, and charging a first user account a billing rate associated with the first geo-fence for the connection.

In another exemplary embodiment, the present invention is a method for billing a user of a telecommunication network based on location. The method includes receiving a first location of a mobile communication device during a first connection, determining the first location to be within a first geo-fence, and charging a first user account a first billing rate associated with the first geo-fence for the connection.

In yet another exemplary embodiment, the present invention is a logic on a computer readable medium for billing a user of a telecommunication network based on location. The logic includes a first portion for receiving a first location of a mobile communication device during a first connection, a second portion for determining the first location to be within a first geo-fence, and a third portion for charging a first user account a first billing rate associated with the first geo-fence for the connection.

DETAILED DESCRIPTION OF THE INVENTION

Figure 1:
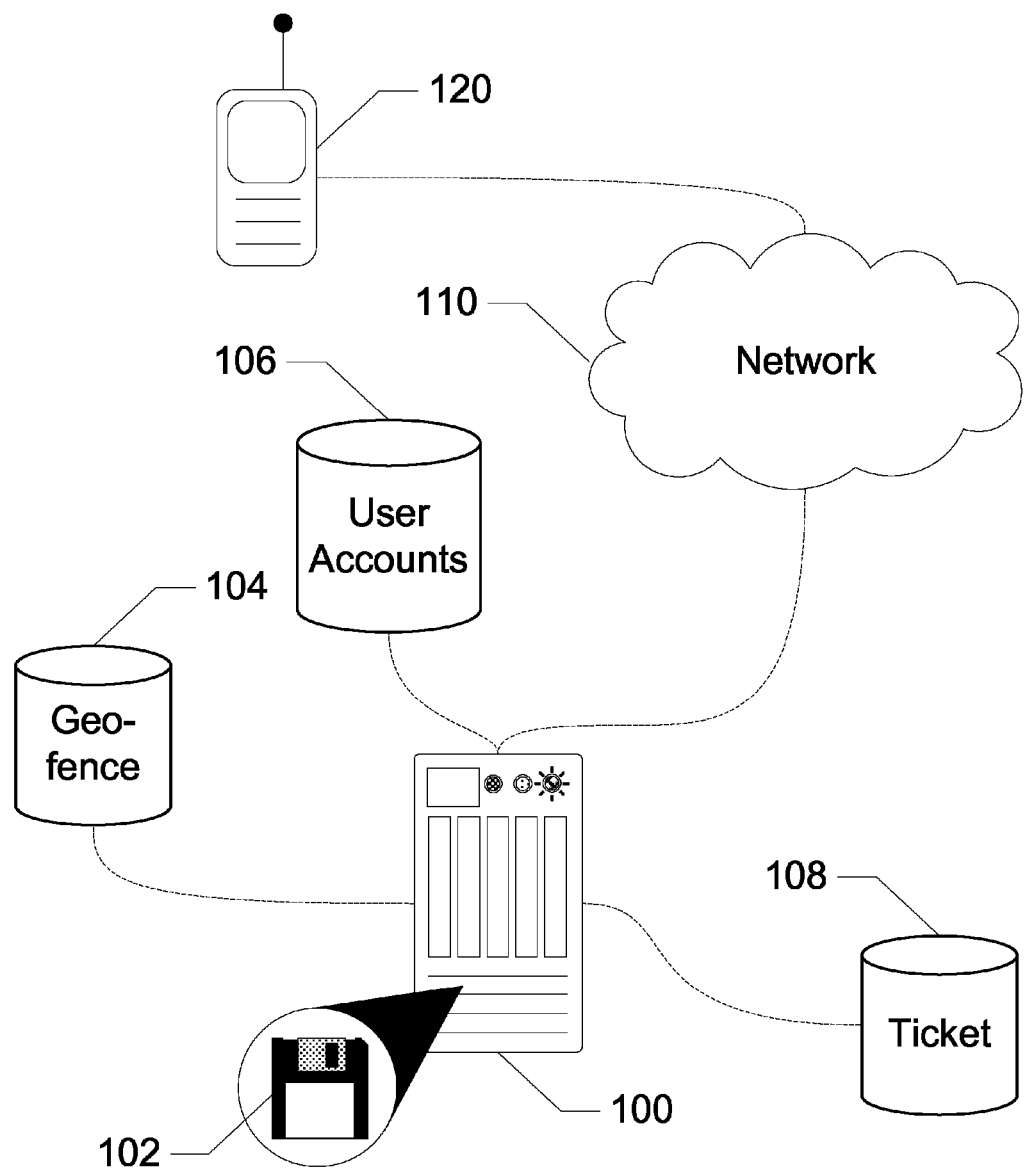
FIG. 1 shows a system for billing a user of a telecommunication network based on location, according to an exemplary embodiment of the present invention.

The present invention discloses devices, systems, and methods for billing users of a telecommunication network. Exemplary embodiments of the present invention feature a billing server in communication with a geo-fence database. The geo-fence database contains records for a plurality of geo-fences. Some geo-fences are associated with a particular mobile communication devices, such as a home geo-fence, work geo-fence, etc., while other geo-fences are global, such as a stadium geo-fence, toll geo-fence, etc. When a mobile communication device enters the perimeter of a geo-fence, the billing server changes the rate at which connections are billed to the user account, or bills another user account. The mobile communication device can send a ticket code to the billing server for a reduced billing rate while within a geo-fence. If a mobile communication device enters a toll geo-fence, then the billing server charges the user account for the toll.

"Mobile communication device", as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

"Telecommunication network", as used herein and throughout this disclosure, refers to a wireless network, a wireline network, or any network including a combination of wireless and wireline network elements. A telecommunication network can include broadband wide-area networks, local-area networks, and personal area networks. Communication across a telecommunication network is preferably packet-based; however, radio and frequency/amplitude modulations networks can enable communication between communication devices using appropriate analog-digital-analog converters and other elements. Examples of radio networks include cellular (GPRS, UMTS, TDMA, CDMA, etc.), Wi-Fi, BLUETOOTH(RTM) networks, etc., with communication being enabled by hardware elements called "transceivers." Some mobile communication devices may have more than one transceiver, capable of communicating over different networks. For example, a cellular telephone can include a GPRS transceiver for communicating with a cellular base station, a Wi-Fi transceiver for communicating with a Wi-Fi network, and a positioning satellite receiver for receiving a signal from a positioning satellite. A telecommunication network typically includes a plurality of elements that host logic for performing tasks on the telecommunication network. In modern packet-based wide-area networks, servers may be placed at several logical points on the telecommunication network. Servers may further be in communication with databases and can enable communication devices to access the contents of a database. A server can span several network elements, including other servers in the telecommunication network.

"Geo-fence", as used herein and throughout this disclosure, refers to a virtual perimeter on a geographic area defined by a network operator, a service provider, or a user. A geofence can be based on a cell site, or on (Global Positioning Satellite) GPS coordinates for greater accuracy. A geo-fence can be any shape such as a rectangle defined by four points, a circle defined by a center and a radius, etc. In a telecommunication network, a mobile communication device responds to entering or leaving an area bound by a geo-fence. The mobile communication device may respond with a notification, an application, or interaction with connected hardware such as a smart vehicle. For instance, geo-fences are used to notify parents of children leaving designated areas, shut down a vehicle before entering a restricted area, etc.

A "vehicle," as used herein and throughout this disclosure, includes cars, trucks, and buses, as well as aircrafts and watercrafts.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for billing a user of a telecommunication network based on location, according to an exemplary embodiment of the present invention. The system includes a mobile communication device 120 communicating with a billing server 100 across a telecommunication network 110. Billing server 100 communicates with a geo-fence database 104, a user account database 106, and a ticket database 108. Billing server 100 includes a billing logic 102. Geofence database 104 includes a plurality of geo-fences. Each geo-fence defines a perimeter inside of which the user pays a different billing rate for connections. User account database 106 includes a plurality of user accounts. Each user account is linked to a mobile communication device. However, more than one user account may be associated with a single mobile communication device, and a single user account can be associated with a plurality of mobile communication devices. Geo-fence database 104 can be invoked to determine which user account is billed for a connection. Ticket database 108 includes a plurality of tickets. Each ticket has a unique identifier which is sent to billing server 100 for verification, and is associated with a geo-fence. A ticket may be used for a discounted billing rate, new services, etc., while within the geo-fence. Each element in FIG. 1 can communicate directly or indirectly, and can communicate wired or wirelessly.

Billing logic 102 receives a location of mobile communication device 120 during a connection. The location is determined at a GPS chip on mobile communication device 120, by performing a signal strength triangulation from antennas nearby mobile communication device 120, etc. Logical elements on network 110 such as an LCS client, a GMLC server, SUPL server, etc are not shown, but can be used to determine a precise location of device 120. If billing logic 102 determines that the location is within a geo-fence, then billing logic references the geo-fence in the geo-fence database. The geo-fence includes a billing rate and/or a user account. Connections made to or from mobile communication device 120 within the geo-fence are billed at the billing rate associated with the geo-fence to the user account associated with the geo-fence. The user account billed inside the geo-fence may be the same as the user account billed outside the geo-fence.

Billing logic 102 can receive a ticket from mobile communication device 120 while inside a geo-fence. This can occur in a stadium geo-fence or a geo-fence associated with some other public forum. A unique identifier is sent to billing server 100 for verification of the ticket. Once verified, billing logic 102 applies the contents of the ticket to the connections made within the geo-fence by mobile communication device 120. The contents may include a discounted billing rate, one or more abilities, etc. For instance, service rates in a crowded stadium may be higher, but a ticket allows the user to make connections with mobile communication device 120 at a regular billing rate.

In other embodiments, geo-fences are associated with many other rates, features, and services. Tickets may also be used for a range of discounts, new services, etc. Tickets may be used within user-defined geo-fences such as within a home geo-fence or a work geo-fence. If a user goes on vacation to a foreign country, a user may purchase a ticket to use service at a regular or reduced billing rate while in that country for the period of the vacation. There are many possibilities for tickets that will become apparent to those having skill in the art upon reading this disclosure. In one embodiment, when a user first opens an account, the user receives a map showing the geo-fences and the billing rates associated with each geo-fence.

Figure 2:
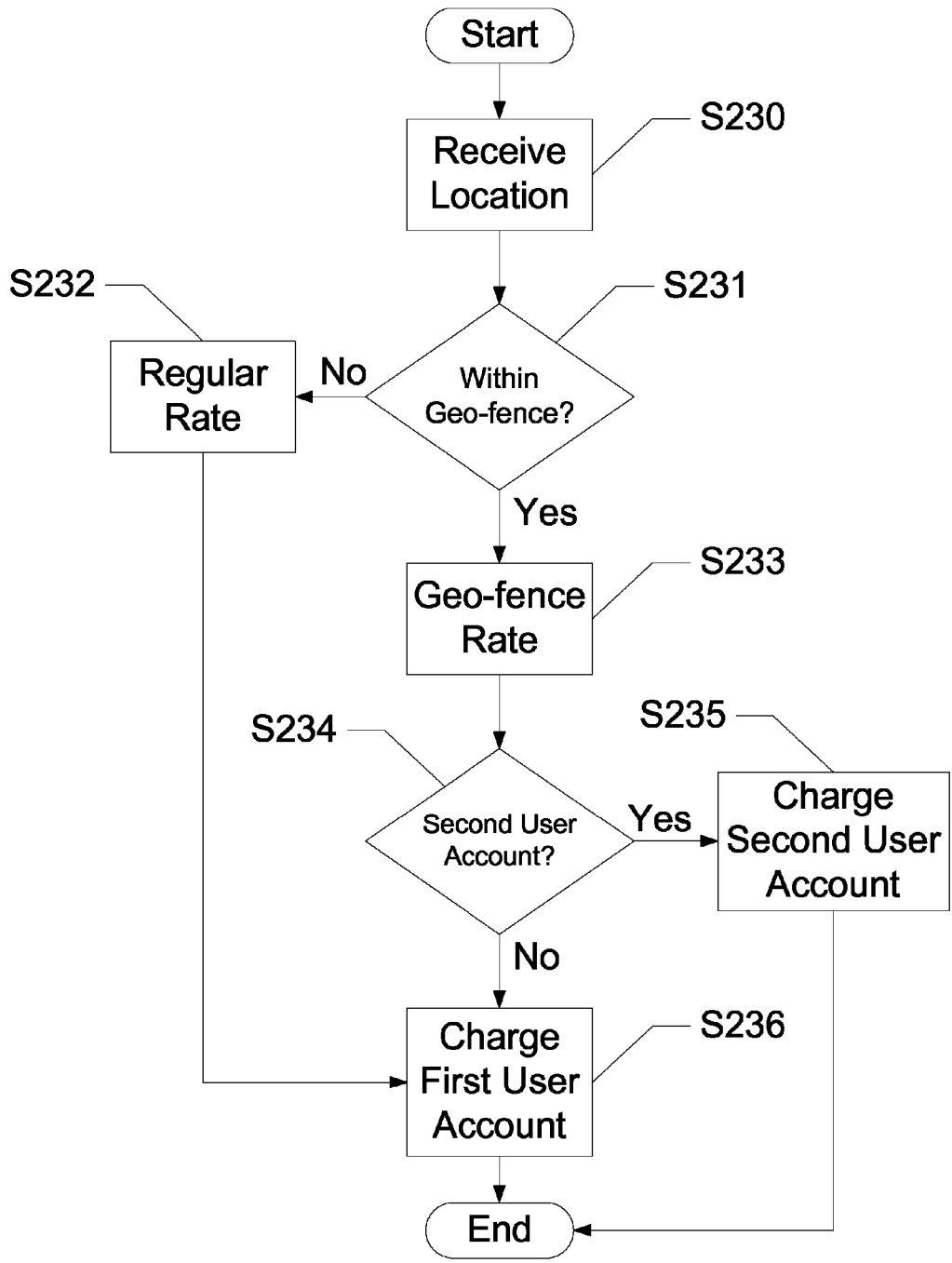
FIG. 2 shows a method for billing a user account of a telecommunication network based on location, according to an exemplary embodiment of the present invention.

FIG. 2 shows a method for billing a user account of a telecommunication network based on location, according to an exemplary embodiment of the present invention. This embodiment is presented from the point of view of a billing server or a billing system. Before billing the user for a connection, the billing server receives a location of a mobile communication device S230. The billing server then searches a geo-fence database to determine if the location is within a geo-fence S231. If the location is within a geo-fence, then a new billing rate is applied to the connection S233. If the location is not within a geo-fence, then a regular billing rate is applied to the connection S232. If the location is within a geo-fence, then the billing server checks to see if the geo-fence contains an instruction to bill a second user account for connections within the geo-fence S234. If the geo-fence contains an instruction to bill a second user account, then the second user account is charged for the connection S235. If the geo-fence contains no such instruction, then the first or primary user account is charged for the connection S236.

Though this embodiment of the method is performed by a billing server, other servers or network elements may work in tandem with the billing server to accomplish the method. Furthermore each task of the method may be assigned to a different network element, each network element being suited to perform the task assigned. For instance, a database server may be more suited to referencing the geo-fence database, and a location server may be more suited to making a location determination before forwarding it to the billing server. When connections traverse geo-fences, such as in a moving vehicle, an algorithm may be employed to split the charge of the connection between billing rates based on the amount of time within each geo-fence, amount of data transferred within each geo-fence, etc.

In an exemplary embodiment of an agreement between a service provider and a user, a user is offered a particular package for being at home, at work, and for limited travel between these locations. The user account is associated with a minimum of two geo-fences. One geo-fence encloses the user's home and property while another geo-fence encloses the user's work building and surrounding area. The agreement gives the user benefits for making connections within the home geo-fence and the work geo-fence. The benefits may be unlimited service within those geo-fences, guaranteed QoS, higher bandwidth, etc.

Figure 3:
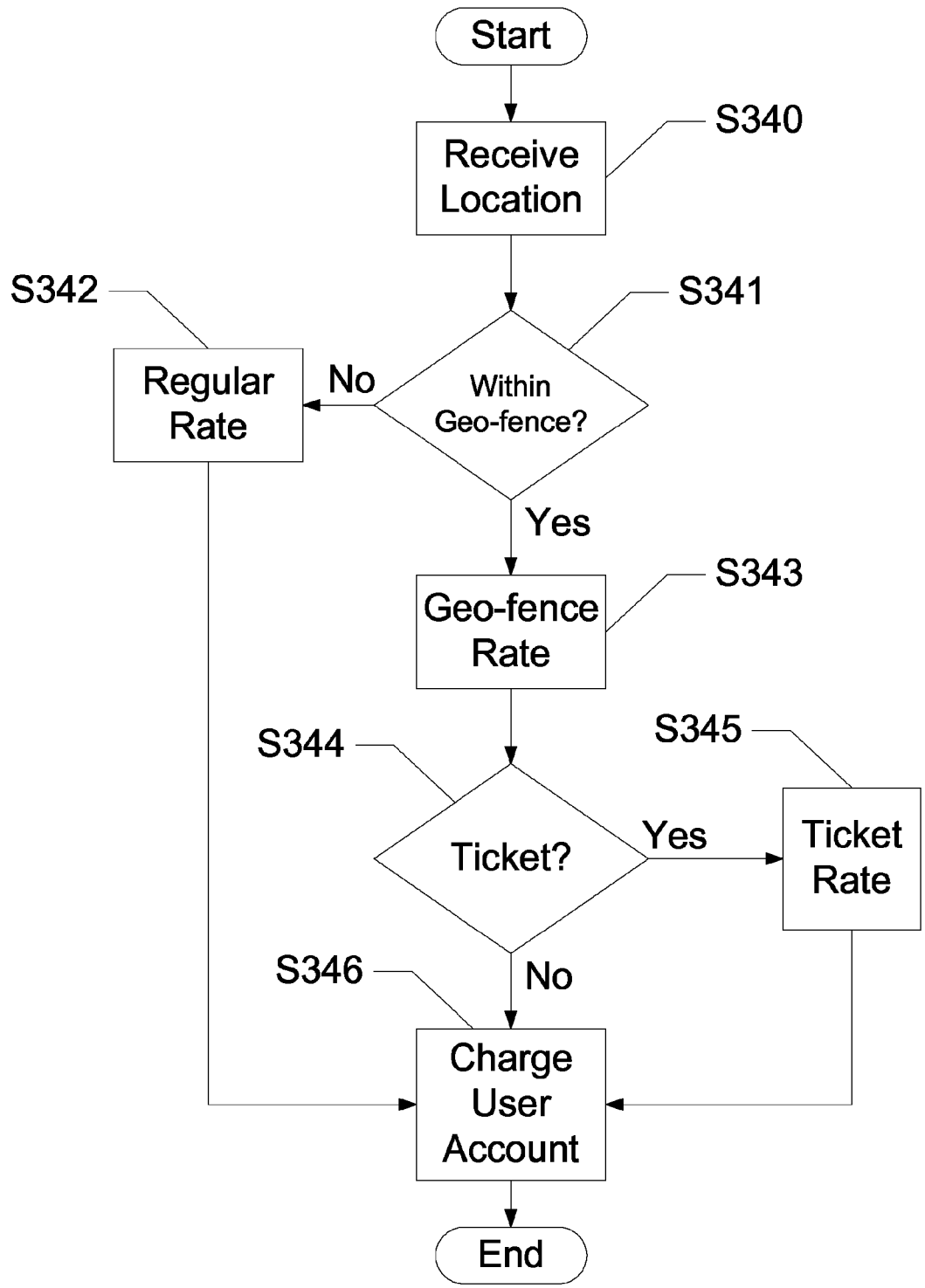
FIG. 3 shows a method for billing a user of a telecommunication network a ticket rate, according to an exemplary embodiment of the present invention.

FIG. 3 shows a method for billing a user of a telecommunication network a ticket rate, according to an exemplary embodiment of the present invention. This embodiment is presented from the point of view of a billing server or a billing system. Before billing the user for a connection, the billing server receives a location of a mobile communication device S340. The billing server then searches a geo-fence database to determine if the location is within a geo-fence S341. If the location is within a geo-fence, then a new billing rate is applied to the connection S343. If the location is not within a geo-fence, then a regular billing rate is applied to the connection S342, and the regular billing rate is charged to the user account S346. If, however, the location is within a geo-fence, and the geo-fence billing rate is applied S343, then it is determined whether the user has a ticket associated with the geo-fence S344. If the user has a ticket, then the billing server receives a unique identifier of the ticket from the mobile communication device and charges a ticket rate for connections from the mobile communication device within the geo-fence S345. If the billing server does not receive a unique identifier of a ticket from the mobile communication device, then the billing server charges the geo-fence billing rate for connections from the mobile communication device within the geo-fence. Once the proper billing rate is determined, the user account is billed for the connection S346.

Tickets may be gained by purchasing them ahead of time, or granted as complimentary gifts, prizes, loyalty rewards, etc. For popular events in stadiums, arenas, etc., the ticket may come included with the purchase of preferred seating, box seats, or every seat. Advance purchasers may receive tickets for priority connections over users who purchase admission at the door. Though this embodiment of the method is performed by a billing server, other servers or network elements may work in tandem with the billing server to accomplish the method. Furthermore each task of the method may be assigned to a different network element, each network element being suited to perform the task assigned.

Other exemplary embodiments of the present invention feature a smart vehicle which assists in the payment of tolls.

Figure 4:
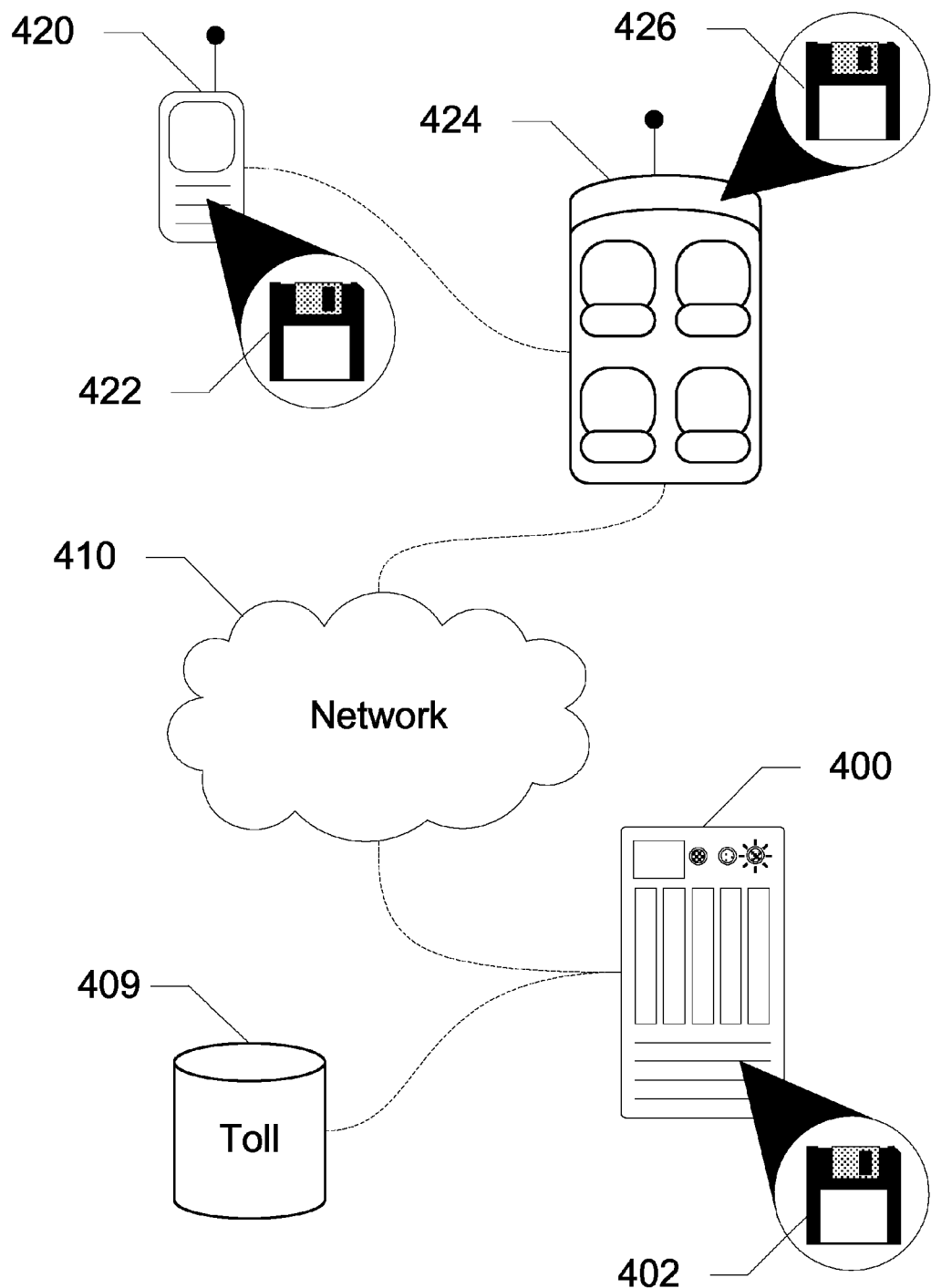
FIG. 4 shows a system for billing a user of a telecommunication network for a toll, according to an exemplary embodiment of the present invention.

FIG. 4 shows a system for billing a user of a telecommunication network for a toll, according to an exemplary embodiment of the present invention. In this embodiment, the system includes a smart vehicle 424 with a client logic 426, a mobile communication device 420 with a wireless logic 422, a network 410, and a billing server 400 with a server logic 402 and a toll database 409. Smart vehicle 424 is in communication with mobile communication device 420 and with billing server 400 over network 410. Mobile communication device 420 is shown outside smart vehicle 424 for purposes of showing the flow of communication only. It is to be understood that mobile communication device 420 is used by an occupant of smart vehicle 424. Smart vehicle 424 transmits a request to mobile communication device 420, and wireless logic 422 responds with a unique identifier. Client logic 426 on smart vehicle 424, via an antenna and transceiver, receives the unique identifier from mobile communication device 420, and uses NFC techniques such as triangulation, signal strength, or signal propagation delay to determine the relative position of mobile communication device 420 within smart vehicle 424.

Client logic 426 transmits the unique identifier of the mobile communication device 420 and location of smart vehicle 424 to billing server 400 via network 410. This transmission may occur via Wi-Fi, GPRS, or other protocols capable of communicating such information across a wide-area network such as the Internet. Billing server 400 is part of a back end of network 410, or can be part of an external network operated by another service provider, such as a governmental or municipal entity operating the toll. Billing server 400 includes a user account that is associated with the unique identifier transmitted from mobile communication device 420. Server logic 402 determines the association with the user account, and bills the user account an amount based upon the location of mobile communication device 420. The relationships between toll geo-fences and the particular amount to be billed are specified in toll database 409. Toll database 409 can also store the user accounts and correlate the user accounts with the specific amounts to be charged per location. The user is then billed by debiting the account or by sending a bill to the user's address, wherein the address can be stored in the user account.

Figure 5:
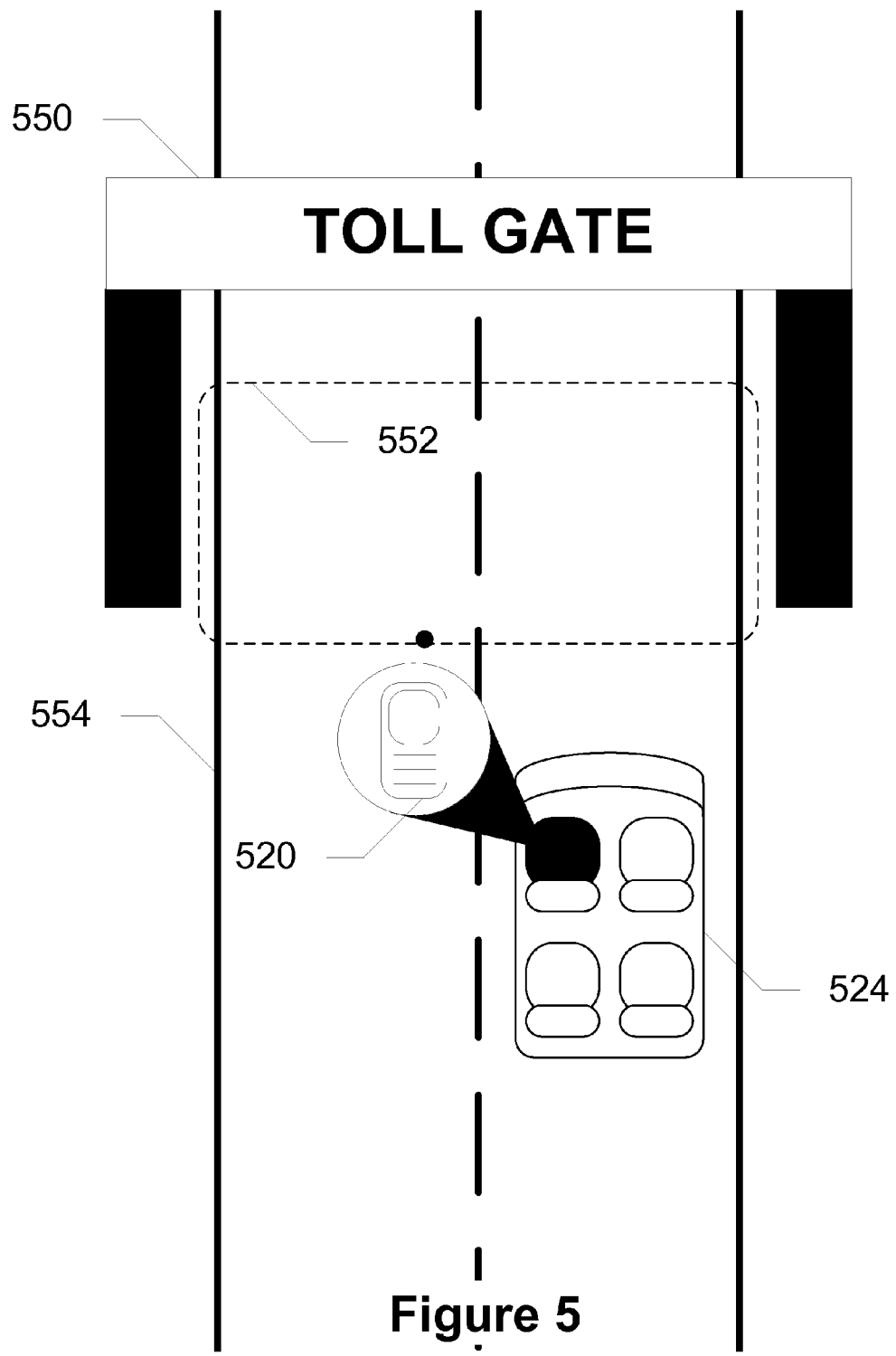
FIG. 5 shows a user of a smart vehicle charged for a toll, according to an exemplary embodiment of the present invention.

FIG. 5 shows a system for charging a user of a smart vehicle for a toll, according to an exemplary embodiment of the present invention. In this embodiment, smart vehicle 524 is operated by a driver having a mobile communication device 520. Smart vehicle 524 is traveling along road 554, approaching toll gate 550. A toll geo-fence 552 is defined within the proximity of toll gate 550. Toll geo-fence 552 may be defined by the toll gate operator, the service provider, etc. In any case, the toll geo-fence 552 is defined in the toll database.

Other exemplary embodiments of the present invention feature a smart vehicle which assists in the payment of tolls.

In other exemplary embodiments, any or all of the occupants in the smart vehicle can pay the toll. The driver and passengers can decide between themselves which person is to pay the toll. In these embodiments, the designated occupant indicates to the smart vehicle that they will pay the toll. The driver and passengers may also decide to split the tolls, create an order for paying tolls, etc. This may be decided before the smart vehicle ever enters a toll lane, such as when the passengers get into smart vehicle. Alternatively, this is decided when a toll amount is due, for instance, by sending a request to the mobile communication devices, and receiving a response from a particular mobile communication device.

Figure 6:
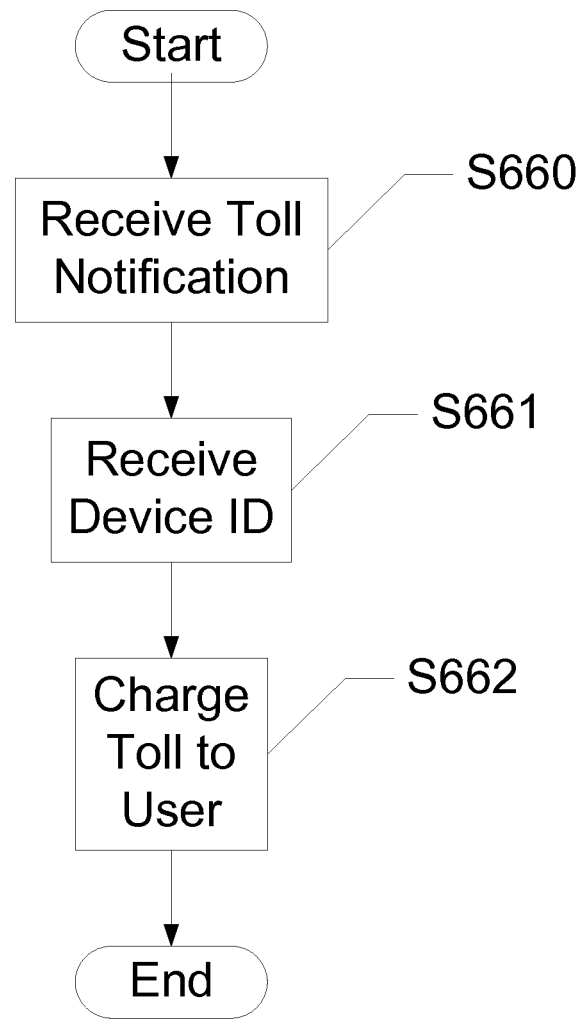
FIG. 6 shows a method of billing a user of a telecommunication network for a toll, according to an exemplary embodiment of the present invention.

FIG. 6 shows a method of billing a user of a telecommunication network for a toll, according to an exemplary embodiment of the present invention. This embodiment is presented from the point of view of a billing server or a billing system. When a smart vehicle enters a toll geo-fence, a notification is sent to the billing server across the telecommunication network S660. The smart vehicle also transmits an identification of the driver's mobile communication device S661. This identification may be a telephone number, an MSISDN, an IP address, etc. Once the mobile communication device is identified, a user account associated with the mobile communication device is charged for the toll S662.

Alternately, a user may be driving a vehicle without a smart system. In these embodiments, wireless logic onboard the mobile communication device handles the sending and receiving of information to and from the billing server. However, use of a smart vehicle may be preferred in cases where more than one mobile communication device is inside the vehicle. Client logic within the smart vehicle can identify a driver, query passengers for toll acceptance on behalf of the driver, split the toll between driver and passenger(s), etc.

In yet another embodiment, the billing server recognizes that the smart vehicle is traveling on a toll highway by tracking the smart vehicle. Besides detecting location, the billing server charges according to the distance the user travels, measured absolutely, or relative to a detected number of exits along the toll highway. The billing server uses location information to determine when the smart vehicle enters the toll highways, when the smart vehicle leaves the toll highway, and charges the user accordingly. In even further embodiments, a government or municipality charges users based on how much total distance of road has been used daily, weekly, monthly, etc.

Other embodiments account for the instance where a smart vehicle may not have a mobile communication device present while being driven. In this event, the billing server receives the location of the smart vehicle and its identification, but does not receive a unique identifier of a mobile communication device associated with a driver or passenger of the smart vehicle. The smart vehicle is associated with a default mobile communication device so that the user can still pay for the toll automatically. However, if the smart vehicle does not contain the mobile communication device because the smart vehicle has been stolen, then a different action needs to take place. In further embodiments, a notification is sent to the default mobile communication device. This notifies the user that the smart vehicle is being driven and asks if this is an authorized use of the smart vehicle. In cases where a parent loans the smart vehicle to a child, the user can accept this as an authorized use. However, if the user indicates the use is unauthorized, then the authorities may be notified of a stolen vehicle. In even further embodiments, the driver of the stolen smart vehicle may lose control once the smart vehicle is reported stolen. A server commands the smart vehicle to slow to a stop and disable the engine. Smart vehicles may additionally lock a thief inside the smart vehicle until the authorities arrive.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for billing a user of a telecommunication network based on location, the system comprising:
 a processor, a user account database storing a plurality of user accounts including a first user account and a second user account, a geo-fence database storing a plurality of geo-fences including a first geo-fence associated with a first billing rate and a second geo-fence associated with a second billing rate; and
 a memory storing instructions that, when executed by the processor, cause the processor to perform operations comprising receiving a first location of a mobile communication device during a first connection, determining the first location to be within the first geo-fence, charging the first user account the first billing rate associated with the first geo-fence for the first connection, wherein the first billing rate is applied to utilization of telecommunications services by the mobile communication device during the first connection, receiving a ticket code from the mobile communication device while the mobile communication device is within the first geo-fence, the ticket code associated with a discounted billing rate, and after receiving the ticket code, charging the first user account the discounted billing rate associated with the ticket code, in place of the first billing rate, for the first connection while the mobile communication device is within the first geo-fence, wherein the first geo-fence remains associated with the first billing rate.

2. The system of claim 1, wherein the operations further comprise:

receiving a second location of the mobile communication device during a second connection;

determining the second location to be within the second geo-fence; and charging the second user account a second billing rate associated with the second geo-fence for the second connection, wherein the second billing rate is applied to utilization of telecommunications services by the mobile communication device during the second connection.

3. The system of claim 1, wherein a user account different from the first user account is charged for connections made by the mobile communication device while the mobile communication device is outside the first geo-fence.

4. The system of claim 1, further comprising a toll database in communication with the billing server, the toll database having a toll geo-fence and a toll amount.

5. The system of claim 1, wherein the operations further comprise:

receiving a notification from a smart vehicle when the smart vehicle enters the toll geo-fence, the notification including an identification of the mobile communication device; and charging the first user account the toll amount.

6. A method for billing a user of a telecommunication network based on location, the method comprising:

receiving, at a billing server comprising a processor, a first location of a mobile communication device during a first connection;

determining, by the billing server the first location to be within a first geo-fence, the first geo-fence associated with a first billing rate;

charging, by the billing server, a first user account the first billing rate associated with the first geo-fence for the first connection, wherein the first billing rate is applied to utilization of telecommunications services by the mobile communication device during the first connection;

receiving, by the billing server, a ticket code from the mobile communication device while the mobile communication device is within the first geo-fence, the ticket code associated with a discounted billing rate; and after receiving the ticket code, charging, by the billing server, the first user account the discounted billing rate associated with the ticket code, in place of the first billing rate, for the first connection while the mobile communication device is within the first geo-fence, wherein the first geo-fence remains associated with the first billing rate.

7. The method of claim 6, further comprising:

receiving a second location of the mobile communication device during a second connection;

determining the second location to be within a second geo-fence; and charging a second user account a second billing rate associated with the second geo-fence for the second connection, wherein the second billing rate is applied to utilization of telecommunications services by the mobile communication device during the second connection.

8. The method of claim 6, wherein a user account different from the first user account is charged for connections made by the mobile communication device while the mobile communication device is outside the first geo-fence.

9. The method of claim 6, further comprising:

receiving a notification from a smart vehicle when the smart vehicle enters a toll geo-fence, the notification including an identification of the mobile communication device; and charging the first user account a toll amount.

10. The method of claim 6, further comprising:

receiving a notification from a smart vehicle when the smart vehicle enters a toll geo-fence, the notification including an identification of a passenger mobile communication device associated with a passenger user account; and charging the passenger user account a toll amount.

11. The method of claim 6, further comprising defining a geo-fence for one of a home location of the user or a work location of the user.

12. A computer readable medium storing instructions that, when executed by a processor, cause the processor to perform operations comprising:

receiving a first location of a mobile communication device during a first connection;

determining the first location to be within a first geo-fence, the geo-fence associated with a first billing rate;

charging a first user account the first billing rate associated with the first geo-fence for the first connection, wherein the first billing rate is applied to utilization of telecommunications services by the mobile communication device during the first connection;

receiving a ticket code from the mobile communication device while the mobile communication device is within the first geo-fence, the ticket code associated with a discounted billing rate; and after receiving the ticket code, charging the first user account the discounted billing rate associated with the ticket code, in place of the first billing rate, for the first connection while the mobile communication device is within the first geo-fence, wherein the first geo-fence remains associated with the first billing rate.

13. The computer readable medium of claim 12, wherein the operations further comprise:

receiving a second location of the mobile communication device during a second connection;

determining the second location to be within a second geo-fence; and charging a second user account a second billing rate associated with the second geo-fence for the second connection, wherein the second billing rate is applied to utilization of telecommunications services by the mobile communication device during the second connection.

14. The computer readable medium of claim 12, wherein a user account different from the first user account is charged for connections made by the mobile communication device while the mobile communication device is outside the first geo-fence.

15. The computer readable medium of claim 12, wherein the operations further comprise:
    receiving a notification from a smart vehicle when the smart vehicle enters a toll geo-fence, the notification including an identification of the mobile communication device; and
    charging the first user account a toll amount.

16. The computer-readable medium of claim 12, wherein the operations further comprise:
    receiving a notification from a smart vehicle when the smart vehicle enters a toll geo-fence, the notification including an identification of a passenger mobile communication device associated with a passenger user account; and
    charging the passenger user account a toll amount.

17. The computer-readable medium of claim 12, further comprising defining a geo-fence for one of a user's home location and a work location.

* * * * *